United States Patent Office 3,521,771
Patented July 28, 1970

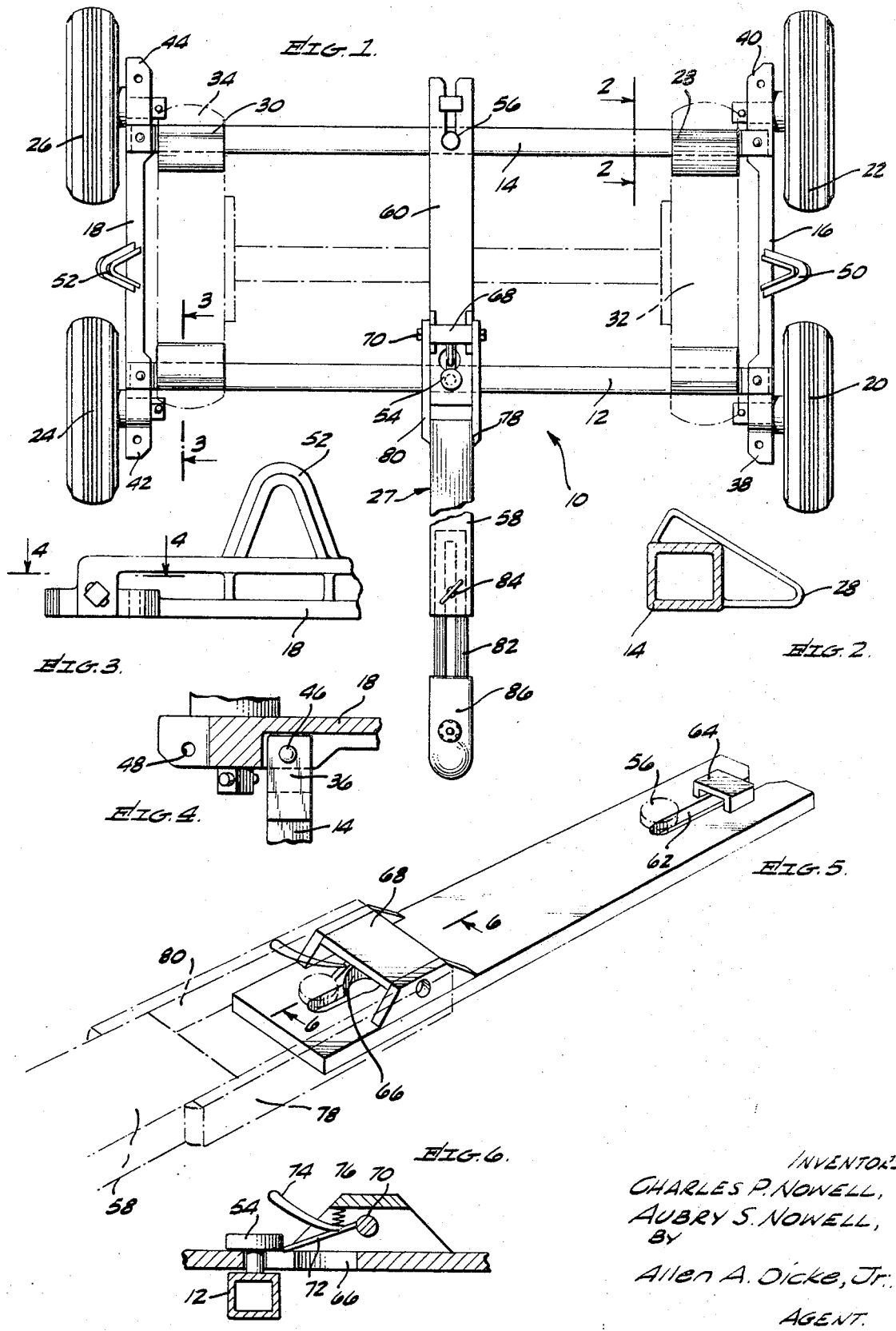

3,521,771
DOLLY
Charles P. Nowell, 7305 El Domino, Buena Park, Calif. 90620, and Aubrey S. Nowell, 832 Felicidad St., Anaheim, Calif. 92801
Filed Oct. 16, 1968, Ser. No. 767,974
Int. Cl. B60b 37/00
U.S. Cl. 214—331   10 Claims

ABSTRACT OF THE DISCLOSURE

The dolly is sectionalized so that cross rails can be placed under the disabled vehicle, the end pieces installed thereon and then the dolly is jacked up for installation of its dolly wheels. A tow bar is pivotally attached by vertical pins to each of the cross pieces at its center, and at its forward end is attachable to the towing ball on a towing vehicle. The cross pieces are attached to the end pieces by vertical pins so that the dolly is steerable in accordance with the direction it is pulled by the towing vehicle.

BACKGROUND

Disabled vehicles cause a great deal of difficulty to their owners and other members of the travelling public. The vehicle owner loses his transportation, often when he badly needs it, and is usually a considerable distance from a place where repairs can be performed. Sometimes the disabled vehicle can be simply repaired. The auto owner usually easily changes a wheel when a tire has become deflated. However, more serious breakdowns often occur. Upon such more serious breakdowns, a tow truck is called and the mechanic attempts to put the automobile in drivable condition. However, if he cannot, he employs the tow truck to tow the disabled automobile back to a place where the necessary repair services can be prepared. Such towing requires the services of a specially equipped tow truck which engages one end of the disabled automobile, lifts it and tows the automobile away on its remaining two wheels. In any event, the services of a specially equipped tow truck are required, and such tow trucks are expensive and require the services of a skilled operator. Thus, there is a need for a dolly for supporting one end of an automobile to permit it to be towed, without the employment of a usual tow truck.

Dollies are known, and one such dolly is disclosed in Charles P. Nowell Pat. No. 3,198,539. That dolly can be readily placed under one end of a disabled vehicle. However, the dolly is not equipped for towing or steering so that it still requires the services of a tow truck to lift the other end of the disabled vehicle and tow it away. Thus, the dolly of the prior patent is especially suitable for use in supporting one end of an automobile which is severely disabled. However, it still must be used in conjunction with a tow truck.

SUMMARY

This invention is directed to a dolly suitable for the support of one end of a disabled automotive vehicle, and suitable for towing the disabled vehicle with one end supported by the dolly while it is towed away. The dolly comprises cross rails which are individually placeable under the disabled vehicle, followed by the attachment of end pieces thereto. The attachment comprises pivotal attachment to provide steering flexibility to the dolly. Wheels are thereupon attachable to the end pieces, and a tow bar is pivotally attachable to the cross rails. Upon attachment of tow bar to a towing vehicle, the disabled automotive vehicle can be towed away.

Accordingly, it is an object of this invention to provide a dolly which is capable of supporting a portion of an automotive vehicle, and which is capable of being towed so that the disabled automotive vehicle can be moved away without the employment of a conventional tow truck. It is another object of this invention to provide a dolly which is comprised of separable parts so that it may be placed under a disabled automotive vehicle, and raised to position wherein it can be employed for towing away the disabled automotive vehicle. It is still another object of the invention to provide pivotal structure in the dolly so that the dolly is steerable to follow the towing vehicle, while it carries a portion of a disabled automotive vehicle thereon. It is still another object of this invention to provide a dolly having cross bars, with wheel-carrying end pieces pivotally secured to the cross bars, and a tow bar pivotally secured to the cross pieces so that upon towing of the dolly by the tow bar, the dolly pivots so as to be steerable and follow when it is drawn by its tow bar. Other objects of this invention will become apparent from the study of the following portion of this specification, the claims and the attached drawings.

BRIEF DESCRIPTION OF THE DRAWINGS

FIG. 1 is a top plan view of the dolly of this invention;

FIG. 2 is an enlarged section taken on the line 2—2 of FIG. 1;

FIG. 3 is an enlarged partial elevational view taken along the line 3—3 of FIG. 1;

FIG. 4 is an enlarged partial section taken generally along the line 4—4 of FIG. 3;

FIG. 5 is an isometric view of a portion of the tow bar of the dolly of this invention; and FIG. 6 is an enlarged section taken generally along the line 6—6 of FIG. 5.

DESCRIPTION

Referring to the drawings, the dolly of this invention is generally indicated at 10. Dolly 10 comprises front and rear cross rails 12 and 14, left and right end pieces 16 and 18, to which are respectively attached wheels 20 and 22, and 24 and 26, and a tongue or tow bar 27.

Front and rear cross rails 12 and 14 are identical, and simply face in opposite directions, so only rear cross rail 14 need be described. Rear cross rail 14 carries wheel pads 28 and 30 thereon toward the ends so that wheels 32 and 34 of a disabled vehicle may be respectively supported thereon. Cross rails 12 and 14 are preferably made of square tube, for strength, and at the ends they carry upper and lower flanges, such as upper flange 36 illustrated in FIG. 4.

These flanges are spaced so that the webs on left and right end pieces 16 and 18 extend therebetween. Left end piece 16 has front and rear webs 38 and 40 while right end piece 18 has front and rear webs 42 and 44. These webs extend to both the front and rear of the axle openings for the dolly wheels, and have at least one opening therein. As is seen in FIG. 4, each web preferably has two or more vertically oriented pivot holes 46 and 48 so that the corresponding openings in the flanges on the end of the cross rails can be aligned with these pivot openings and a pivot pin placed therethrough. When each end of the cross rails is suitably positioned, and the pivot pins are in place, it is seen that a parallelogramic structure is obtained.

After the cross rails are placed under the disabled vehicle and are pivotally pinned to the end pieces, as indicated, the end pieces are raised for the installation of the dolly wheels thereon. Jacking lugs 50 and 52 are respectively provided on the end pieces 16 and 18, so that an ordinary bumper jack can be employed to raise the end pieces. Wheels 20, 22, 24 and 26 are each rotatably mounted upon a shaft which has a square inner end for passage through a corresponding square hole in the end pieces. When so located, the square shafts are pinned in place so that they are maintained upon the dolly.

Secured to each of the front and rear cross rails is an upstanding pivot pin, these pivot pins being indicated at 54 and 56, respectively. Pivot pins 54 and 56 have cylindrical shanks and enlarged heads. Tow bar 27 includes front section 58 and rear section 60. As is seen in FIGS. 1 and 5, rear section 60 has slot 62 therein, which slot is of such diameter as to accept the shank of pivot pin 56, with the head carried on top of rear section 60. Bridge 64 bridges over slot 62 and is of sufficient dimension to pass the head of pivot pin 66 thereunder. Bridge 64 prevents spreading of the fingers of rear section 60 where they extend alongside the slot.

Similarly, the front end of rear section 60 has a keyhole slot 66 therein, which keyhole slot is large enough at its larger portion to accept the head of pivot pin 54, and is large enough at its smaller portion to accept the shank of pivot pin 54, but retain the head thereof on the top of rear section 60. The dimensions between slot 62 and 66, as well as the length of slot 62, are such that cross rails 12 and 14 may be placed in any one of the pivot pin holes in the end pieces, and still both of pivot pins 54 and 56 will be respectively engaged by these slots.

Bridge 68 is secured to the top of rear section 60 over the larger portion of keyhole slot 66. It has side flanges through which pivot bolt 70 extends. Lock plate 72, see FIG. 6, is mounted upon pivot bolt 70 and carries operating handle 74. Spring 76 urges lock plate 72 to the downward position shown in FIG. 6, where it locks behind the head of pivot pin 54 to hold the pivot pin in the narrow portion of the keyhole slot 66.

The position of lock plate 72 is such that the head of pivot pin 54 can be forced through the larger portion of the keyhole slot to thrust back the lock plate, and when the pivot pin is moved into the narrow portion, the lock plate snaps down and engages behind the head of the pivot pin to securely lock it in place. To unlock the pivot pin, operating handle 74 is manually engaged to raise lock plate 72 out of locking position.

Front section 58 of the tow bar 27 is a tongue which has side plates 78 and 80 which extend rearwardly on each side of rear section 60 and engage around the side plates on bridge 68. Pivot bolt 70 passes through suitable openings in side plates 78 and 80 so that front section 58 is pivoted on a horizontal axis with respect to rear section 60. This permits the tongue to be engaged on the ball of a towing vehicle, and provides the necessary vertical freedom. The tongue includes an inner telescoping extension section 82 which is preferably comprised of a pair of tubular sections spaced from each other and secured to each other. Inner telescoping extension section slides into the rectangular tube which comprises front section 58.

Lock pin 84 extends through openings in the larger tube, and between the smaller tubes of the inner telescoping extension section 82 so that the tongue may be lengthened if necessary. Cross pieces between the two tubes which comprise the inner telescoping extension section engage lock pin 84 to prevent the extension section from being completely removed and to permit towing. The front end of the inner telescoping extension section 82 carries a standard ball socket 86 for engagement on a ball of a towing vehicle to permit the dolly to be towed with its load.

The manner of deployment of dolly 10 beneath a disabled vehicle is best illustrated in FIGS. 6 through 8 of Charles P. Nowell Pat. 3,198,538. Cross rails 12 and 14 are put in place, and end pieces are thereupon mounted to them. In the present structure, however, the flanges on the ends of the cross rails embrace the flanges on the end pieces, and pivot pins are put in place through the flanges. Thus, a rectangular structure without wheels is put in place with its cross rails extending under the disabled vehicle. This rectangular structure is raised as is illustrated in the aforementioned Nowell patent, and wheels 20, 22, 24 and 26 are installed on the end pieces and are secured thereto.

Thereupon, tow bar 27 is put in place. Slot 62 is engaged around the shank of pin 56 and the tow bar is slid rearwardly until the head of pivot pin 54 is aligned with the larger portion of the opening in keyhole slot 66. At that point, tow bar 27 is pressed down so that the head of pivot pin 54 passes through the large portion of the keyhole slot. When engaged, the tow bar 60 is slid rearwardly until lock plate 72 engages on the back of the head of pivot pin 54. By means of an inner telescoping extension section 82, ball socket 86 is moved forward and is clamped over the towing ball on the towing vehicle. When it is clamped, lock pin 84 is positioned between cross pieces between the two tubes of the extension section and is locked to prevent additional telescoping motion, and the disabled automotive vehicle is ready to be towed.

It is seen that the dolly of this invention is suitable for towing the end of a disabled automotive vehicle closest to the towing vehicle. If the other end of the disabled vehicle does not have a pair of operative wheels, a dolly of a nature shown in the above-mentioned Charles P. Nowell Pat. 3,198,538 can be employed to support the end of the disabled vehicle farthest from the towing vehicle. When towing proceeds, the direction of pull on the tow bar positively steers the dolly 10 so that it properly follows the towing vehicle. Thus, the disabled vehicle can be safely moved along the highway to a place of repair.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:
1. A dolly for the transportation thereon of a portion of an automotive vehicle, said dolly comprising:
front and rear cross rails adapted to engage under a portion of an automotive vehicle;
left and right end pieces secured to said front and rear cross rails;
wheels mounted upon said end pieces so that said dolly is movable, the improvement comprising:
said left and right end pieces being pivotally mounted to said front and rear cross rails on substantially vertical axes so that said front cross rail is laterally translatable with respect to said rear cross rail so that said dolly is steerable; and
a tongue pivotally mounted to said front and rear cross rails on substantially vertical axes, said tongue being adapted to be engaged by a towing vehicle so that said dolly can be towed.
2. The dolly of claim 1 wherein said cross rails and said end pieces having interengaging flanges, said pivotal mounting of said end pieces on said cross rails comprising pivot pins extending through said interengaging flanges.
3. The dolly of claim 2 wherein said cross rails have top and bottom flanges extending on each end thereof, said flanges embracing a flange on each of said end pieces so that said pivot pin extends through said flanges on said cross rails and said flange on said end piece.
4. The dolly of claim 2 wherein said wheels mounted on said end pieces are demountable and said pivot pins through said interengaging flanges are removable so that said cross rails can be placed beneath a disabled automotive vehicle and said end pieces can be pivotally pinned thereto, said end pieces having a jack engaging means thereon so that said end pieces can be raised for mounting said wheels on said end pieces.

5. The dolly of claim 1 wherein said tow bar has front and rear slots therein and said pivotal attachment of said tow bar to said front and rear cross rails comprises front and rear tow bar pivot pins, said front and rear tow bar pivot pins each having a shank and an enlarged head, said front and rear slots in said tow bar respectively engaging around said shank and below said head of said first and second tow bar pivot pins.

6. The dolly of claim 5 wherein said rear slot in said tow bar is an elongated slot extending to the rear end of said tow bar, and said front slot in said tow bar is a keyhole slot having an enlarged end of sufficient size to pass said enlarged head on said front tow bar pivot pin and a narrow end of sufficient size to pass said shank and insufficient size to pass said head of said front tow bar pivot pin.

7. The dolly of claim 6 wherein a lock plate is pivotally attached to said tow bar, said lock plate being positioned against the side of said head of said front tow bar pivot pin when said front tow bar pivot pin is positioned in the narrow end of said keyhole slot in said tow bar to inhibit motion of said pivot pin toward the enlarged portion of said keyhole slot.

8. The dolly of claim 1 wherein said tow bar is comprised of front and rear sections, said rear section being pivotally mounted on substantially vertical axes to said front and rear cross rails, and said front section being pivotally mounted upon a substantially horizontal axis to said rear section so that the front end of said front section is free to vertically move in accordance with motion of the towing vehicle.

9. The dolly of claim 8 wherein said front section of said tow bar includes an inner telescoping extension section slidable within the main body of said front section of said tow bar, and locking means for locking said inner telescoping extension section with respect to said main body of said front section of said tow bar.

10. The dolly of claim 9 wherein said inner telescoping extension section comprises first and second parallel rods, and at least one bridge extending between said rods, said locking means comprises a lock pin extending through said main body of said front section of said tow bar and between said rods so that said cross pieces between said rods prevent removal of said inner telescoping extension section.

References Cited

UNITED STATES PATENTS

| | | | |
|---|---|---|---|
| 1,697,285 | 1/1929 | Neighbour | 280—103 |
| 2,437,823 | 3/1948 | Jonkhoff | 280—98 X |
| 2,733,932 | 2/1956 | Stidham | 280—103 |
| 2,943,863 | 7/1960 | Corey et al. | 214—330 X |
| 3,198,538 | 8/1965 | Nowell | 280—35 |

HUGO O. SCHULZ, Primary Examiner

U.S. Cl. X.R.

280—444